Sept. 27, 1966  R. N. WIECHARD ET AL  3,274,961
SYSTEM FOR HEATING AIR AND DRYING FUEL
Filed Dec. 29, 1964  3 Sheets-Sheet 1

INVENTORS:
ROBERT N. WIECHARD
JOHN B. ANDERSON
BY

AGENT

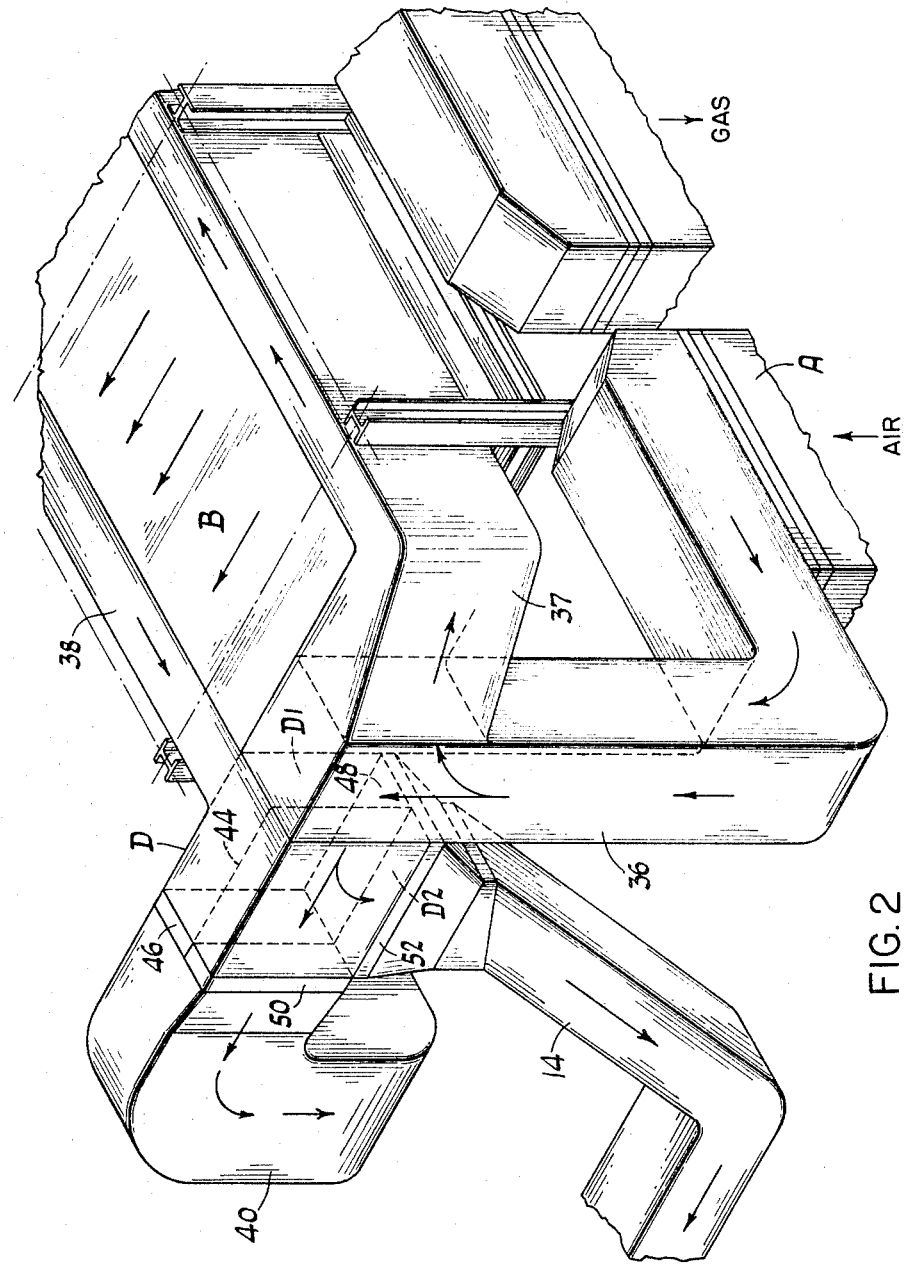

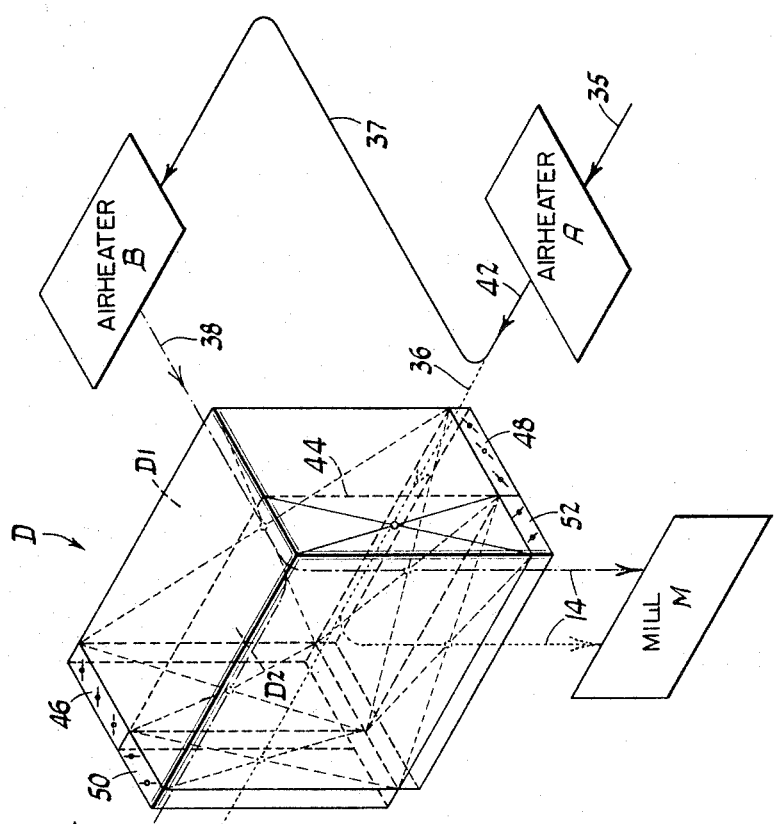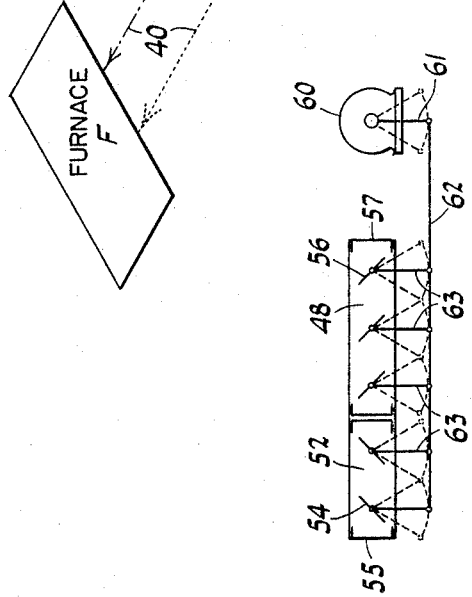

United States Patent Office 3,274,961
Patented Sept. 27, 1966

3,274,961
SYSTEM FOR HEATING AIR AND DRYING FUEL
Robert N. Wiechard, Hartford, and John B. Anderson, West Hartford, Conn., assignors to Combustion Engineering, Inc., Windsor, Conn., a corporation of Delaware
Filed Dec. 29, 1964, Ser. No. 421,855
5 Claims. (Cl. 110—56)

This invention relates to a system for heating air and drying fuel and is more specifically concerned with a system for supplying heated air to a steam generating furnace for burning fuel and to a pulverizer for drying the fuel before burning it in the steam generator furnace.

When burning pulverized fuel such as coal in a furnace it is very desirable for economic reasons to separate as much as possible the moisture in the coal from the coal, before the coal is fed to the furnace chamber for burning. This is best accomplished by pulverizing the coal in a pulverizer or mill while it is suspended in an atmosphere of gas such as combustion gas or air, which has previously been heated to a high temperature to cause evaporation of the moisture in the fuel. The resulting water vapor is then either vented to the atmosphere or is discharged into the furnace chamber with the pulverized fuel and primary air.

While it is desirable to supply primary air or gas at a temperature high enough to drive the moisture from the fuel particles, it is equally important, especially when employing air as the drying and transporting medium, to limit the air temperature to a value which will safely avoid ignition of the fuel in the mill or in the conduit leading from the mill to the burners. Accordingly, the temperature of the drying air must be controlled within narrow limits, so as to be high as possible and yet without causing fires in the mill or fuel piping.

Under normal operating conditions the mill air or primary air temperature can easily be maintained at a desired level when only small variations in moisture in the fuel occur. This is usually done by mixing cold tempering air with the hot air entering the pulverizer. However, in many installations large variations in moisture content are encountered, for instance, when burning a large variety of fuels or when burning fuel which is exposed to the weather and which in the wintertime may be mixed with ice and snow. Under these conditions, not only will a larger air heater be required to obtain a higher air temperature for drying the high moisture coal, but an excess quantity of cold tempering air will be needed when burning low moisture coal, which will decrease the efficiency of the steam generator. Accordingly, additional measures must be taken to increase and to regulate the temperature of the primary air without the use of excess amounts of tempering air.

When faced with this problem, it is found advisable to install an additional air heater in the gas passages of the steam generator for the purpose of providing mill air of the required high temperature to meet the high moisture content that is at times being encountered in the fuel. In order to effectively control this mill air temperature an elaborate system of ducts and dampers has become necessary which provides a regulated flow of air from the first and/or from the second air heater to the mill and to the furnace. In this manner both the quantity as well as the temperature can be regulated of the air entering the boiler furnace chamber for burning the fuel and also of the air entering the mill for drying the fuel, with the air flowing through and being heated by one of the air heaters or both.

With the size of steam generators increasing at a rapid rate over the years the required duct and damper system has become cumbersome and costly. To overcome this difficulty the present invention provides a simplified and improved duct arrangement which has as its primary feature a manifold or distributing chamber with integrally arranged flow controlling dampers included.

It is accordingly an important object of the present invention to simplify and substantially reduce the cost of an air heater duct system which is designed to supply the furnace chamber and the fuel pulverizer with heated air or regulated temperature and quantity.

It is another object of the invention to proportion the air between the furnace chamber and the mill as it is received either from the first or from the second air heater or from both.

Other objects and advantages of the invention will become apparent from the following description of an illustrative embodiment thereof when taken in conjunction with the accompanying drawings wherein:

FIG. 2 is an enlarged isometric view of the distributing chamber, the damper arrangement and the furnace duct connections from air heaters A and B, and leading to the furnace chamber and to the mill;

FIG. 3 is a diagrammatic illustration of the herein disclosed simplified and improved air heating system including the apparatus depicted in FIG. 2; and FIG. 4 is a diagrammatic representation of two air dampers provided with a linkage for simultaneously operating both so as to open the one while closing the other.

Figure 1:
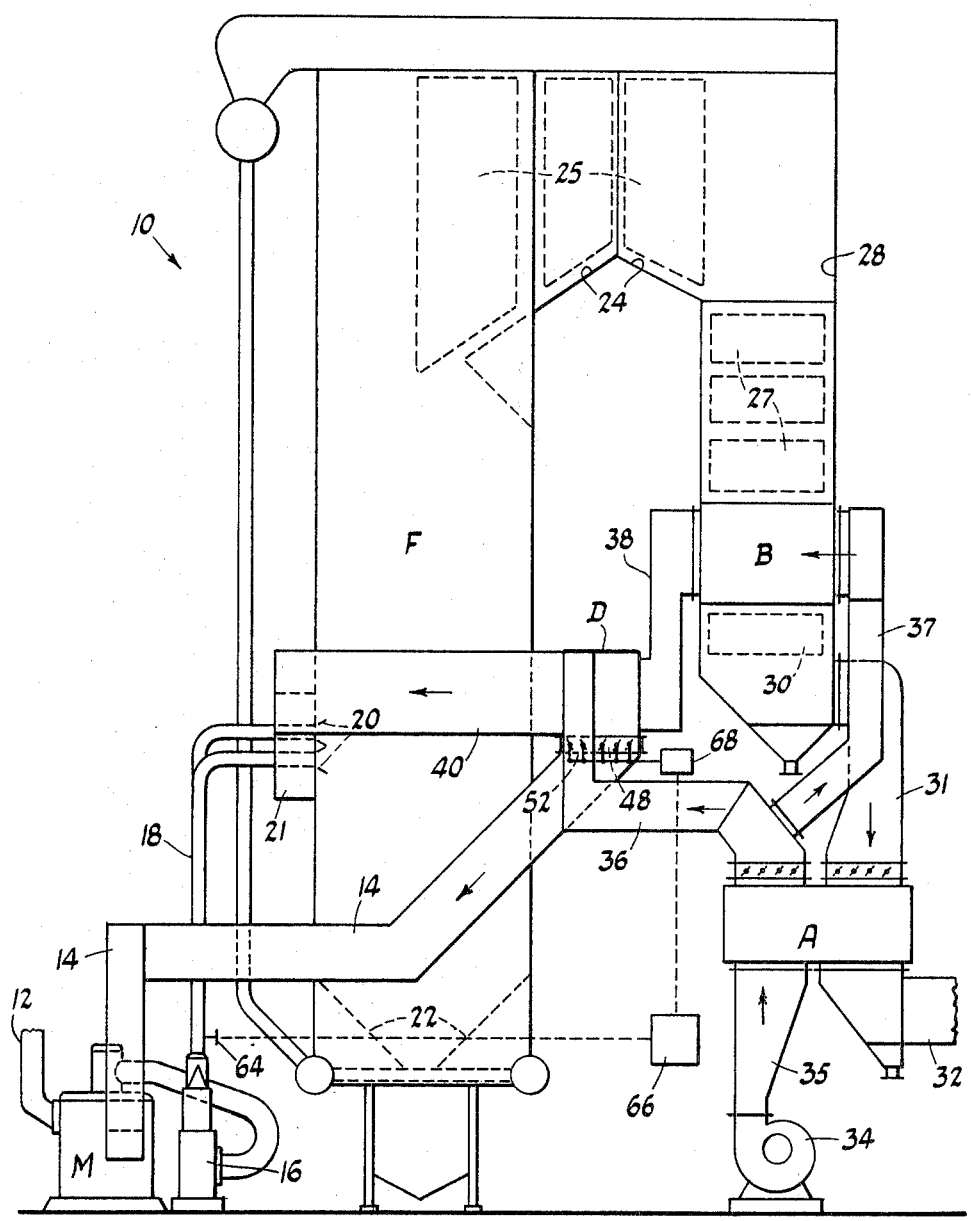
FIG. 1 is an elevational view of a steam generator equipped with the herein disclosed improved and simplified arrangement of air heater ducts and temperature controlled dampers.

Referring now to the drawings wherein like reference characters are used throughout to desinate like elements, the illustrative and preferred embodiment of the invention depicted therein includes a vapor generator designated generally as 10 and comprising pulverizer or mill M, a furnace chamber F, a first air heater A and a second air heater B. Fuel for pulverizing enters mill M by way of conduit 12. While being pulverized the fuel is mixed with hot air, so-called primary air, received from duct 14. The resulting mixture of pulverized fuel suspended in air is drawn from the mill B by an exhauster 16 and is delivered to the furnace chamber F by way of conduits 18 and burners 20. These burners are surrounded by a wind box 21 through which additional hot air, so-called secondary air, is blown into the furnace with the pulverized fuel to be burned. The combustion gases produced rise in furnace chamber F and give off heat to tubes 22 lining the walls of the chamber for the generation of steam. The combustion gases leave the furnace F by way of a horizontal gas pass 24 in which are located heating surfaces such as superheater 25 for superheating the steam. Additional superheating surface 27 is located in a downward gas pass 28 through which the gases flow. A recuperative air heater B preferably of tubular construction is also provided in gas pass 28. This air heater is an important part of the air heating system hereinbelow described in greater detail. After passing through air heater B the combustion gases give off heat to an economizer 30 for heating the feedwater, then pass through duct 31 to flow over the heating surfaces of air heater A which preferably is of the regenerative type. Finally, the gases are exhausted to the atmosphere by way of duct 32 and an induced draft fan and stack, not shown.

Cold air is delivered to first air heater A by means of forced draft fan 34 and duct 35. After having been heated to a desired temperature the air flows directly to distributing chamber D by way of duct 36. If additional heating is required to raise the temperature the preheated air is conducted via duct 37 to a second air heater B and thence by duct 38 to distributing chamber D.

From distributing chamber or manifold D the heated air coming from first air heater A or from second air heater B can now be distributed as desired as primary air by way of duct 14 to the pulverizer M for drying the fuel or as secondary air for burning the fuel by way of duct 40, wind box 21 and burners 20.

FIG. 2 illustrates in isometric and enlarged form the distributing chamber D and the ducts leading from air heaters A and B and those leading to wind box 21 and to mill M. Only one-half of air heater B is shown in FIG. 2 which is symmetric about boiler centerline 43. Air heater B preferably is of the recuperative tubular type with the combustion gases, for example, passing through vertically arranged tubes and the air flowing around the tubes in horizontal direction as indicated by the arrow. As shown in FIG. 2 the manifold D is divided into two chambers D1 and D2 by a division plate 44. Duct 38 leading from the outlet of air heater B is connected to one of the outer sides of chamber D1 for passage of heated air thereinto. Two outlets from chamber D1 are provided each equipped with a damper 46 and 48, respectively. Damper 46 is connected to duct 40 leading to wind box 21 and burners 20 (see FIG. 1). Damper 48 is connected to duct 14 leading to pulverizer M (see FIG. 1). Similarly, duct 36 coming from air heater A is connected to one of the outer sides of chamber D2 for passage of heated air thereinto. Two outlets from chamber D2 are provided each equipped with a damper 50 and 52, respectively. Damper 50 is connected to duct 40 leading to wind box 21 and burners 20. Damper 52 on the other hand is connected to duct 14 leading to pulverizer M, as shown in FIG. 1.

FIG. 3 shows the distributing chamber D in a slightly enlarged view with the air heaters A and B, furnace F, mill M and duct connections shown diagrammatically for clarity's sake. The flow of air from air heater A to furnace F and mill M via distributing chamber D1, damper 50 and damper 52, respectively, is shown in dot-dot lines. The flow of air from air heater A to air heater B via ducts 42 and 37 is shown in solid lines. The flow of air from air heater B to furnace F and mill M via chamber D1, damper 46 and damper 48, respectively, is shown in dot-dash lines.

For any given amount of steam generated a definite amount of fuel must be burned in the presence of an optimum amount of air. This air is divided between mill M and wind box 21, or furnace, by the setting of dampers 52, 48 and 50, 46. Since the air having passed through air heaters A and B is substantially hotter than the air having only passed through air heater A, the temperature of the air entering the mill can be regulated by varying the proportion of air passing into duct 14 from air heater A by way of manifold D and damper 52, and the air from air heater B by way of manifold D and damper 48. Thus the setting of dampers 48 and 52 is such that, while the proportion of air passing through each may change, the total quantity of air passing through both dampers remains substantially the same.

The above can be accomplished by operating dampers 48, 52 in the manner diagrammatically illustrated in FIG. 4. Damper 52 comprises damper blades 54 which are pivotally supported on a damper frame 55. Damper 48 comprises damper blades 56 which are pivotally supported on a damper frame 57. A damper activating mechanism 60 is operatively connected to damper blades 54 and 56 by linkage elements 61, 62 and 63 of conventional design. As illustratively shown in FIG. 4 the damper blades are set in such a manner that when blades 54 are being closed blades 56 are being opened, and vice versa. In this manner while the proportion of the air passing through damper 52 and 48, respectively, is being changed for a setting of the dampers, the total quantity of the air flowing to the mill remains substantially constant. A damper control of similar construction can also be provided to adjust and operate dampers 50 and 46 in a manner which will yield constant air flow entering the furnace but with varying temperatures.

As earlier stated herein, in order to prevent ignition of the fuel in mill M or fuel piping 18, the temperature of the air and fuel mixture leaving mill M must not exceed a safe upper limit. To serve this purpose a temperature sensing device 64 is installed in conduit 18 as shown in FIG. 1, or other suitable location. Temperature indications received by this device are transmitting to a regulator 66, which produces and sends control impulses to damper operating device 68 for operating damper 52 in an opening direction and damper 48 in a closing direction, in response to an increase of the temperature in fuel conduit 18 above a predetermined value, and vice versa. Control devices 64, 66 and 68 can be of well-known conventional design either operated electrically, hydraulically or pneumatically.

While we have illustrated and described a preferred embodiment of our invention, it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

We claim:

1. In a fuel burning system comprising a mill for pulverizing fuel, a furnace for burning said fuel and generation of combustion gases, an air heating system for supplying air to said furnace and to said mill for drying of the fuel, the combination of a first air heater, a second air heater, a distribution chamber, duct means for conducting heated air from said first air heater to said second air heater, means for dividing said distributing chamber into a first portion and a second portion, duct means for conducting heated air from said first air heater to said first chamber portion, duct means for conducting heated air from said second air heater to said second chamber portion, duct means for conducting heated air from said first chamber portion and from said second chamber portion to said mill, and duct means conducting heated air from said first chamber portion and from said second chamber portion to said furnace.

2. The organization as defined in claim 1, having means for controlling the flow of hot air from said first air heater and from said second air heater to said mill and to said furnace.

3. The organization as defined in claim 2, having means for operating said flow control means such that while increasing the flow to said mill from said first air heater the flow from said second air heater is correspondingly decreased, and vice versa.

4. The organization as defined in claim 2, having means for operating said flow control means such that while increasing the flow to said furnace from said first air heater the flow from said second air heater is correspondingly decreased, and vice versa.

5. The organization as defined in claim 1, having means for controlling the flow of hot air from said first air heater and from said second air heater to said mill, means for conducting a pulverized fuel and air mixture from said mill to said furnace for burning, means for obtaining an indication of the temperature of said fuel and air mixture, and means for increasing the flow from said second air heater and decreasing the flow from said first air heater from in response to a decrease of the temperature of said fuel and air mixture, and vice versa.

References Cited by the Examiner

UNITED STATES PATENTS

| | | | |
|---|---|---|---|
| 2,582,830 | 1/1952 | Hawley. | |
| 2,697,408 | 12/1954 | Crites | 110—106 |
| 3,117,538 | 1/1964 | Baver et al. | 110—56 |
| 3,156,200 | 11/1964 | Leeson | 110—56 |

CHARLES J. MYHRE, *Primary Examiner.*